Oct. 31, 1939.  F. C. BRANDENBURG  2,178,509
SHOVEL
Filed March 24, 1939
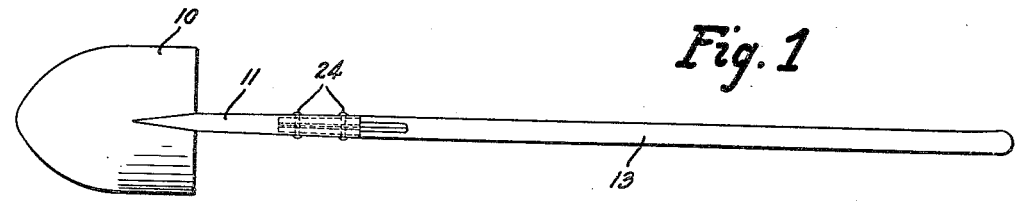
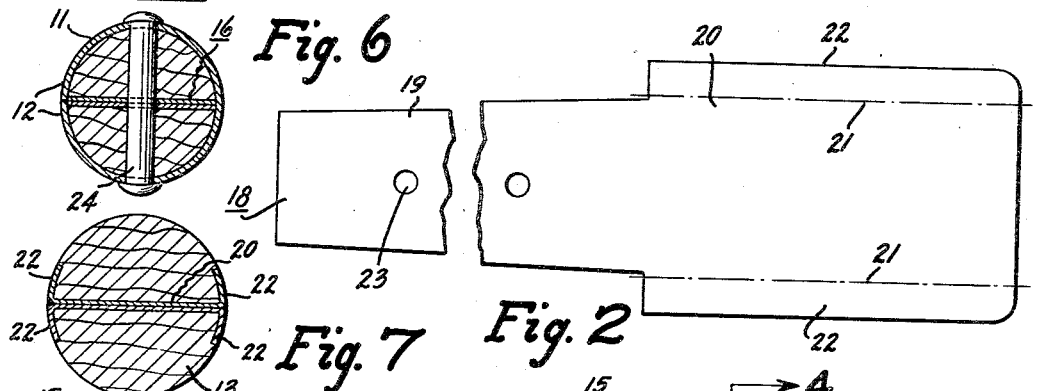
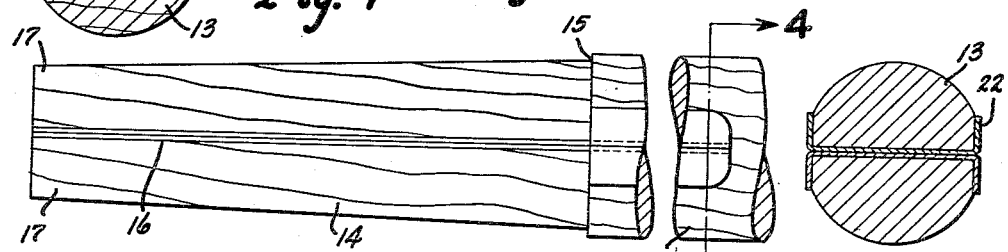
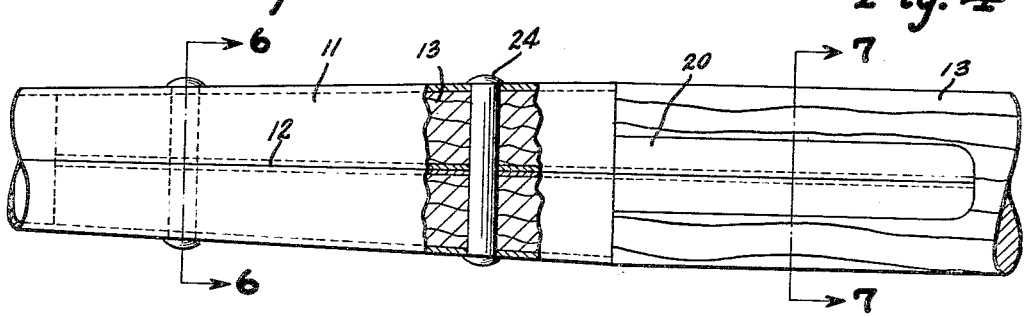
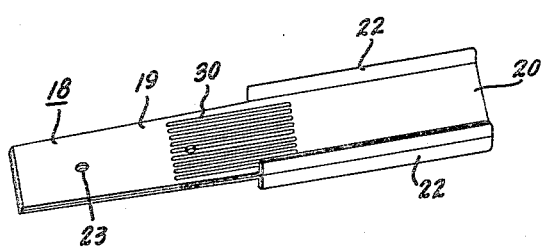
Inventor
Francis C. Brandenburg
By Maréchal & Noe
Attorneys Patented Oct. 31, 1939

2,178,509

UNITED STATES PATENT OFFICE 2,178,509

SHOVEL

Francis C. Brandenburg, Piqua, Ohio, assignor to The Wood Shovel and Tool Company, Piqua, Ohio, a corporation of Ohio Application March 24, 1939, Serial No. 263,895

13 Claims. (Cl. 294—57)

This invention relates to shovels and it is the principal object of this invention to provide a shovel which is light in weight and easily handled and which has increased strength such as to be capable of withstanding substantial overloads encountered during use.

It is a further object to provide such a shovel which incorporates a reinforcing member in predetermined cooperative relationship with the socket of the shovel such as to provide for strengthening the shovel particularly in the zone where the greatest bending moments occur to thus reduce the possibility of failure of the shovel by coordinating the resisting force of the shovel with the bending moments applicable upon various sections thereof.

It is a still further object to provide a shovel of this character having a wood handle in which the reinforcing parts can be tightened if necessary in the event of shrinkage of the wood portion of the handle.

Other objects and advantages of the invention will be apparent from the following description, the accompanying drawing and the appended claims.

In the drawing:

Fig. 1 is a plan view of a shovel constructed in accordance with the present invention;

Fig. 2 is a broken elevational view of an insert or reinforcing member prior to formation into final form;

Fig. 3 is a broken plan view showing the reinforcing member as it is initially positioned in the handle and prior to the pressing of the wing portions into the handle;

Fig. 4 is a sectional view on the line 4—4 of Fig. 3;

Fig. 5 is an elevational view from the rear side of the shovel showing the reinforced handle in position in the shovel socket with the wing portions pressed into the handle, and partly in section through the rivet which retains the handle in the socket;

Fig. 6 is a vertical sectional view through the socket on the line 6—6 of Fig. 5;

Fig. 7 is a vertical sectional view through the handle on the line 7—7 of Fig. 5; and Fig. 8 is a view in perspective of an assembled reinforcing member which has additional strength for resisting cross strains.

Referring to the drawing which discloses a preferred embodiment of the invention, the shovel is provided with a blade portion 10 of suitable shape for the particular use desired of the shovel, the blade having a tubular socket portion 11, formed integrally therewith and curved in the manner shown to provide the desired lift of the shovel blade. The socket is tapered to provide for receiving the end of the handle, and the edges 12 of the socket which come together upon the lower or rear side thereof are either welded together, or held together in closed position by means of the rivet or rivets as will be described in detail hereinafter.

The wood handle member 13 is of suitable shape and is provided with a tapered portion 14 at one end which is chucked as shown at 15 in order to be received within the socket member 11, and to bring the outer surface of the socket substantially flush with the main portion 13 of the handle. In accordance with the present invention a relatively narrow, straight slot 16 is cut in the end of the handle extending from the outer end through the tapered portion 14, and a limited distance into the main portion 13 of the handle forming bifurcations 17 therein. This slot is cut in such manner that it stands substantially vertically of the handle when in position in the socket.

A reinforcing member indicated generally at 18 is provided in the form of a flat metal plate having greater unit strength than wood and as shown in Fig. 2 is formed with a tapered tongue portion 19 and an integrally joined wider section 20. This reinforcing member is of the same or less longitudinal extent than the length of the slot and is adapted to be positioned in the slot 16, extending substantially to the inner end thereof. Two plates are preferably utilized in side by side relation, and are inserted longitudinally of slot 16 either separately, or preferably as a previously formed unit attached to each other by suitable means such as spot welding.

The length of the portion 20 of the reinforcing member corresponds with the depth of slot in the main portion 13 of the handle so that when the plate or plates are in position in the slot the portion 20 is coextensive with the length of slot in the part 13 of the handle, and the tongue portions 19 of the reinforcing plates lie within the tapered portion 14 of the handle and between bifurcations 17. The width of the tapered portion of the plates is commensurate with that of the tapered portion of the handle, so that the outer edges of the tongue portions 19 of the plates do not extend beyond the outer diameter of part 14 of the handle and preferably lie substantially flush therewith on both the upper and lower sides thereof. The part 20 however is of greater width than the diameter of the portion 13 of the handle so that these parts extend somewhat beyond the handle on the upper and lower sides thereof forming a pair of wings 22 above and below the handle. Thus as shown in Fig. 2 the lines 21 indicate the outer diameter of the portion 13 of the handle, with the wings 22 projecting outwardly therebeyond.

In assembling the reinforcing member into the socket, the wings 22 are preferably bent outwardly at right angles to the main body of the plates, and the sides of the handle in line with the slot 16 are flattened so that regardless of variations in the thickness of the handle, there with be a constant spacing and the reinforcing member will fit into assembled position with each of the wings lying in close contact and substantially flush with the adjacent flat surfaces.

In order to secure the reinforcing member in the handle, the handle is then placed in a die, and the wings which occupy a position such as shown in Fig. 4 are pressed under substantial pressure into the outer periphery of the handle, so that as shown in Fig. 7 the outer surface is substantially flush with the outer curved periphery of the handle, thereby providing a smooth surface free of edges or sharp corners which might injure the hand of the user. The plates are also provided with apertures 23 to receive the rivets.

The handle is then placed in the socket through which corresponding rivet holes have previously been formed, and the wood then drilled and the apertures in the metal parts reamed to the required size for receiving the rivets 24. With the handle in assembled position in the socket as shown in Fig. 5 the rivets pass through the bifurcations of the handle, the reinforcing plates 18, and the socket 11, thereby securing the handle in operative position, and providing for securely retaining the socket in its closed position. As will also be clear the reinforcing members 18 in such operative position occupy a cooperative and engaging relation with the interior surface of the socket throughout the length of the tapered portion thereof, being in direct engaging and reinforcing relation thereto. The socket with the handle in position therein is then rolled between sets of tapered rollers of progressively closer spacing to compress the same tightly about the handle and to tighten the rivets to hold the handle securely in operative position.

In the usual construction of shovel there is a reduction in the cross sectional area of the wooden handle in that portion which is chucked to be received with the socket and is further reduced in the zone of the rivet, as a result of which failure in use is likely to occur in the zone of the rivet. In the present construction there is a further reduction in the cross section of the wood, but that has been replaced by a metal section having a higher unit strength than the strength of the wood. The section of the wood is also reduced in the main portion of the handle up to the point of termination of the slot, but the bending moment applicable in this main part of the handle progressively decreases as the distance from the working force decreases. Thus the probability of failure taking place in the shovel at the point of termination of the slot may be said to become progressively less the greater the length of the slot. For most economical construction to secure a maximum of strength and reduction in probability of failure, it is desired to secure a substantial balancing and coordination as between the distance of the various sections from the working axis and their total strength so that the moments of forces applicable thereto are properly related to the strengths of the sections themselves. Substantially this relationship is secured in accordance with the present invention, where the high strength necessary to resist the larger bending moments which occur within the handle socket are secured by the utilization of the reinforcing means and its cooperative relationship with the socket.

The construction of reinforcing member as above described provides for substantial increase in strength about the normal working axis in the direction in which the load is usually applied. However a shovel is often subjected to substantial lateral loads, and for this purpose the reinforcing member may be constructed to provide additional strength for resisting forces acting at right angles to the usually applied forces. Thus as shown in Fig. 8 as an alternative construction, each reinforcing plate may be provided with a series of corrugations 30 extending from the tapered portion 19 into the wider portion 20 and preferably extending over the area occupied by at least the inner rivet 24. Both reinforcing members are provided with such corrugations so that they may be interlocked with each other in face to face relation, to provide the substantially increased resistance to forces acting in the direction normal to the reinforcing plate. Such corrugated construction further provides for definite interlocking with the side walls of the slot 16 when the handle socket is tightened about the handle, the assembled device as thus arranged providing for both increased strength in the direction of the usual applied loads and also for loads acting laterally. Further it is found that the cold working of the metal incident to the formation of the corrugations in the reinforcing plates tends to stiffen the section to provide further inherent stiffness and hence to create an increased reinforcing action to loads acting both normally to and in the plane of the reinforcing plate.

The wooden portion of the handle of a shovel is subject to drying out and shrinkage, and where a shovel socket is used in which the seam of the socket is not welded, the socket may be tightened in the event of shrinkage. In accordance with the present invention a construction of reinforcing member is provided which can also be readily tightened as required in order to make up for any shrinkage that may occur in the handle of the shovel. Unless properly provided for, such shrinkage could leave the wing portions 22 with an edge extending above the outer periphery of the handle, which would be objectionable and possibly injurious to the user of the shovel. However in accordance with the present invention the wings may be pressed or hammered down as necessary and likewise the rivets 23 may be tightened so as to maintain a firm and rigid connection of the handle of the shovel in the socket regardless of such shrinkage as takes place during use.

It will likewise be apparent that the present construction provides for readily assembling the handle, and makes it possible to replace handles in the shovel blade quite readily without the use of special equipment or the like. A suitable material which has been successfully used for the plates comprises for example 18 to 20 gage relatively soft steel, this material having been found preferable to a hard steel because it can be more readily formed and retained in the shape of the wings than a harder section of metal, and is subject to some stiffening under the forming operations.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A shovel of the character described comprising a shovel blade having a handle receiving socket formed integrally therewith, a wooden handle having a tapered portion adapted to be received within said socket, said handle having a slot formed therein extending from the tapered end thereof through said tapered portion and for a limited distance beyond said tapered portion, a reinforcing member of greater unit strength than said wood extending into said slot to the inner end thereof, the portion of said member within the tapered part of said handle being tapered to conform substantially with the outer periphery of said handle portion and to engage the socket interiorly on the upper and lower sides thereof, the part of said member beyond the tapered portion having extended wing portions adapted to be turned over and pressed into the wood of the handle to a position substantially flush with the outer surface thereof and a rivet passing through said member, said tapered portion of the handle and the socket inwardly the end thereof, the sections of said shovel handle and of said reinforcing member being coordinated for maximum strength by having a predetermined substantially balanced relation between the total strengths of such sections about the working axis and the moments of the forces applicable thereto.

2. A shovel of the character described comprising a shovel blade having a handle receiving socket formed integrally therewith, a wooden handle having a tapered portion adapted to be received within said socket, said handle having a slot formed therein extending from the tapered end thereof through said tapered portion and for a limited distance beyond said tapered portion, a reinforcing member of greater unit strength than said wood extending into said slot to the inner end thereof, the portion of said member within the tapered part of said handle being tapered to conform susbtantially with the outer periphery of said handle portion and to engage the socket interiorly on the upper and lower sides thereof, the part of said member beyond the tapered portion having extended wing portions adapted to be turned over and pressed into the wood of the handle to a position substantially flush with the outer surface thereof, and a rivet passing through said member, said tapered portion of the handle and the socket inwardly of the end thereof, said reinforcing member providing increased strength in the section through said rivet such as to reduce failure of the shovel in that area.

3. A shovel of the character described comprising a shovel blade having a handle receiving socket formed integrally therewith, a wooden handle having a portion adapted to be received within said socket, said handle having a slot formed therein extending from the end thereof through the portion received within the socket and for a limited distance therebeyond, a reinforcing member of greater unit strength than said wood comprising a pair of plates extending into said slot substantially to the inner end thereof, the outer portion of said plates having a width not greater than the outer diameter of said handle portion and having cooperating relationship with said socket, the parts of said plates beyond the portions thereof received within the socket having outwardly extending wing portions adapted to be turned over in opposite directions and pressed into the wood of the handle on the upper and lower sides thereof to a position substantially flush with the outer surface thereof, and a rivet passing through said member, the portion of the handle within the socket and the socket to retain the handle in position in the socket with the reinforcing means in cooperative relationship with the socket.

4. A shovel-like implement of the character described subject to sustained bending forces in use comprising a work engaging member having a handle receiving socket formed integrally therewith, a wooden handle having a tapered portion adapted to be received within said socket, said handle having a slot formed therein extending from the tapered end thereof through said tapered portion and for a limited distance beyond said tapered portion, a reinforcing member of greater unit strength than said wood comprising a pair of plate-like members having a substantially plane surface and adapted to be positioned in said slot extending substantially to the inner end thereof, the part of said plates within the tapered portion of the handle being tapered to conform substantially with the outer periphery of the handle portion and to engage the socket interiorly in distributed load transmitting relation therewith, the part of said member beyond the tapered portion of the handle extending radially outwardly beyond the periphery of the handle forming wings adapted to be turned over and pressed into the wood of the handle to a position susbtantially flush with the outer surface thereof providing an extended area of contact with said handle, the handle being chucked to be received within the shovel socket with the outer periphery of the socket substantially flush with the main portion of the handle, and means for securing the handle with said reinforcing plates in position therein in operative position in said socket, said reinforcing means providing increased resistance to the forces tending to bend the parts in the plane in which said forces act to transmit and distribute those forces from an extended area of said handle to an extended area of said socket.

5. A shovel-like implement of the character described subject to sustained bending forces in use comprising a work engaging member having a handle receiving socket formed integrally therewith, a cylindrical wooden handle having a portion adapted to be received within said socket, said handle having a slot formed therein extending from the end thereof through and for a limited distance beyond the portion received within said socket, a reinforcing member of greater unit strength than said wood comprising a plate-like member having a substantially plane surface and positioned in said slot extending substantially to the inner end thereof, the part of said reinforcing member within the portion of the handle received within the socket conforming substantially with the outer periphery of the handle portion to engage the socket interiorly in distributed load transmitting relation therewith, the handle being chucked to be received within the socket with the outer periphery of the socket susbtantially flush with the main portion of the handle, said reinforcing member in the portion beyond said socket being formed with wing-like extended portions adapted to be pressed into the wood to provide an extended area of contact with the wood for distributing the bending forces transmitted from said handle into said reinforcing member, and means for retaining the reinforcing member and said handle in operative position within said socket.

6. A shovel of the character described comprising a shovel blade having a handle receiving socket formed integrally therewith, a wooden handle having a portion adapted to be received within said socket, said handle having a slot formed therein in a substantially vertical plane in the portion received within said socket, a reinforcing member of greater unit strength than said wood extending into said slot to the inner end thereof, the portion of said member within the part of said handle received within said socket having a width not in excess of the outer diameter of said handle portion, the part of said member beyond the tapered portion having extended wing portions adapted to be turned over and pressed into the wood of the handle to a position substantially flush with the outer surface thereof, and rivets passing through said member, said socket and the portion of the handle received therein.

7. A shovel of the character described comprising a shovel blade having a handle receiving socket extending integrally from one end thereof, a wooden handle having a portion adapted to be received within said socket, said handle having a slot formed in the end received within said socket in a substantially vertical plane, a reinforcing member of greater unit strength than said wood extending into said slot to the inner end thereof, the portion of said member within the handle having a width commensurate with the diameter of the portion of said handle to engage the socket interiorly on the upper and lower sides thereof, a part of said member projecting beyond the part received within the socket and having extended wing portions adapted to be turned over and pressed into the wood of the handle to a position substantially flush with the outer surface thereof, and a rivet passing through said socket, the portion of the handle received within the socket, and through said member inwardly of the end thereof to provide for reinforcing the handle in the zone of reduced cross section and of high bending moment.

8. A shovel of the character described comprising a shovel blade having a handle receiving socket formed integrally therewith, a wooden handle having a tapered portion adapted to be received within said socket, said handle having a slot formed therein in a substantially vertical plane at the tapered end, a reinforcing member of greater unit strength than said wood extending into said slot to the inner end thereof, the portion of said member within the tapered part of said handle being tapered to conform substantially with the outer periphery of said handle portion and to engage the socket interiorly on the upper and lower sides thereof, the part of said member beyond the tapered portion having extended wing portions adapted to be turned over and pressed into the wood of the handle to a position substantially flush with the outer surface thereof, said reinforcing member having corrugations therein providing increased strength for resisting laterally applied loads, and a rivet passing through said member, said tapered portion of the handle, and the socket inwardly of the end thereof.

9. A shovel of the character described having increased strength comprising a shovel blade having a handle receiving socket provided thereon, a wooden handle having an end adapted to be received within said socket, said handle having a slot formed therein through said end and into the main portion of the handle in a substantially vertical plane forming bifurcations, a reinforcing member of greater unit strength than the wood extending into said slot, the portion of the reinforcing member within said end of the handle which is received within the socket being constructed for cooperative engagement with the wall of said socket, said reinforcing member also having a part extending into the slot in the main part of said handle of greater width than the handle forming wings adapted to be turned over to a position substantially flush with the outer surface of the handle, and a rivet passing through opposite walls of said socket, said bifurcations on the handle, and said reinforcing member to retain the socket in closed position and to retain the handle in assembled position therein, said rivet being adapted to be tightened and said wings being adapted to be pressed into the face of the handle to tighten the same thereupon.

10. A shovel of the character described having increased strength for both directly and laterally applied loads comprising a shovel blade having a handle receiving socket provided thereon, a wooden handle having an end adapted to be received within said socket, said handle having a slot formed therein through said end and into the main portion of the handle in a substantially vertical plane forming bifurcations, a reinforcing member of greater unit strength than the wood extending into said slot, the portion of the reinforcing member within said end of the handle which is received within the socket being constructed for cooperative engagement with the wall of said socket, said reinforcing member also having a part extending into the slot in the main part of said handle of greater width than the handle forming wings adapted to be turned over to a position substantially flush with the outer surface of the handle, said reinforcing member having longitudinally extending corrugations formed therein providing increased strength for resisting laterally applied loads, and a rivet passing through opposite walls of said socket, said bifurcations in the handle and said reinforcing member to retain the handle in assembled position therein.

11. A handle for a shovel-like implement subject to a bending stress primarily in a vertical plane during use comprising a cylindrical wooden handle portion having an end adapted to be received within a socket member formed in the implement, said handle having a slot formed therein in said end in substantially the plane in which the bending forces act, a reinforcing member of greater unit strength than said wood slidably received within and extending into said slot and effective to transmit the bending forces applied to said handle in distributed load transmitting relation therefrom and into said socket, said reinforcing member being received within said socket in the assembled position of said handle and extending outwardly thereof, the part of said reinforcing member received within said socket conforming substantially in dimension with the wood end portion of the handle and the part of said reinforcing member outwardly of said socket having extended wing portions received in the wood over a substantial distance and providing a distributed area of contact therewith, said reinforcing member thereby providing for distributed transmission of the bending loads from the handle into said socket.

12. A handle for a shovel-like implement subject to a bending stress primarily in a vertical plane during use comprising a wooden handle portion having an end adapted to be received within a socket member formed in the implement, said handle having a slot formed therein in said end in substantially the plane in which the bending forces act, a reinforcing member of greater unit strength than said wood extending into said slot and effective to transmit the bending forces applied to said handle in distributed load transmitting relation therefrom and into said socket, said reinforcing member being received within said socket in the assembled position of said handle and extending outwardly thereof, the part of said reinforcing member received within said socket conforming substantially in dimension with the wood end portion of the handle and the part of said reinforcing member outwardly of said socket having extended wing portions received in the wood over a substantial distance and providing a distributed area of contact therewith, said reinforcing member thereby providing for distributed transmission of the bending loads from the handle into said socket, and means for retaining said handle in operative position within said socket.

13. A handle as recited in claim 12, in which the reinforcing member has corrugations therein providing increased strength for resisting laterally applied loads.

FRANCIS C. BRANDENBURG.